United States Patent [19]

Liedtke

[11] 4,382,584

[45] May 10, 1983

[54] SHAFT FURNACE AND A METHOD FOR THE OPERATION OF THE SHAFT FURNACE FOR THE MELTING DOWN OF NON-FERROUS METALS IN A RECYCLING PROCESS, PARTICULARLY FOR THE MELTING DOWN OF LEAD

[75] Inventor: Werner Liedtke, Wesel, Fed. Rep. of Germany

[73] Assignee: Mannesmann Aktiengesellschaft, Dusseldorf, Fed. Rep. of Germany

[21] Appl. No.: 272,332

[22] Filed: Jun. 10, 1981

[30] Foreign Application Priority Data

Jun. 21, 1980 [DE] Fed. Rep. of Germany ....... 3023253

[51] Int. Cl.³ .............................................. F27B 1/20
[52] U.S. Cl. .................................... 266/142; 266/165; 266/176; 266/207; 266/900; 75/77
[58] Field of Search .................... 75/77; 266/142, 200, 266/900, 165, 176, 207

[56] References Cited

U.S. PATENT DOCUMENTS 1,869,571 8/1932 Lenz ..................................... 266/900
3,482,714 12/1969 Oguri ................................... 266/199

FOREIGN PATENT DOCUMENTS 834427 3/1952 Fed. Rep. of Germany ...... 266/199
864678 1/1953 Fed. Rep. of Germany ...... 266/199
2208774 12/1973 Fed. Rep. of Germany ...... 266/199
341428 11/1959 Switzerland ......................... 266/199

*Primary Examiner*—M. J. Andrews
*Attorney, Agent, or Firm*—Mandeville and Schweitzer

[57] ABSTRACT

A shaft furnace for recycling non-ferrous metals is provided with a crane runway extending horizontally above the furnace opening, on which a movable carrier transports sorting containers to the furnace. The carrier is provided with a lifting and gripping mechanism for moving and transporting the sorting containers.

The shaft furnace is provided with a plurality of individually sealable lock chambers which are locked and sealed from the furnace and the outside atmosphere by selectively opening or closing flaps. In addition, a good seal is provided between the sorting container and the shaft furnace by a sealing surface formed by a metal strip which is located opposite the sealing edge of the sorting container.

6 Claims, 2 Drawing Figures

SHAFT FURNACE AND A METHOD FOR THE OPERATION OF THE SHAFT FURNACE FOR THE MELTING DOWN OF NON-FERROUS METALS IN A RECYCLING PROCESS, PARTICULARLY FOR THE MELTING DOWN OF LEAD

BACKGROUND OF THE INVENTION

The invention relates to a shaft furnace for the melting down of non-ferrous metals in a recycling process, particularly for the melting down of lead, comprising a crane runway arranged above the shaft furnace; a carriage movable on said crane runway between a loading station and an unloading station, also located above the shaft furnace; and a trailer cross arm being provided on said car for selectively securing and releasing sorting containers.

Such shaft furnaces are to be classified under the area of foundry furnaces, like cupola furnaces for example. These shaft furnaces are used in one special area for the purpose of recovering non-ferrous metals from assemblies which are no longer usable, like, for example, lead from batteries. The other components to be sorted out, likewise, are rather bulky. The sorted materials are formed, in addition to unbroken batteries and battery scrap, also by furnace slag, coke, iron shavings, iron oxide, limestone and partially dust. These materials are compiled prior to being fed into the shaft furnace in mixing beds. Thereby a pre-selected program determines the mixing ratio of the individual raw materials. The unloading and preparation of the raw material and the storage are carried out in a hall. Tractor shovels handle the transportation in the hall.

DESCRIPTION OF THE PRIOR ART

According to the prior art for the shaft furnaces in operation for the melting down of non-ferrous metals under the recycling method, the top furnace consists of a bell suspended on walking beams and so-called bucket charging installation. It is disadvantageous, in this respect, that with this type of shaft furnaces and upon feeding the batch compiled in the mixing bed the buildup of dust can hardly be avoided. At the same time, combustion gases can escape from the shaft furnace, and conversely the oxygen of the incoming fresh air entering the gas discharge conduit will lead to the creation of an explodable mixture with the furnace gases.

The invention is based on the problem of meeting the requirements for a clean ecology and also of avoiding the escape of dust and exhaust gases and thus the explosive danger in the areas of the shaft furnace inlet and also in the upper shaft furnace area, while assuring at the same time maximum performance and profitability.

SUMMARY OF THE INVENTION

The posed problem is solved according to the invention in that the sorting containers are lockable from the top by means of a cover which can be lowered and secured to a trailer cross arm; that the sorting containers, in feeding position, seal the shaft furnace inlet in a gas-tight manner with their bottoms and are provided, within the sealing edge, with downwardly pivotable bottom flaps and that the shaft furnace inlet is sealable in a gastight manner by means of a pivotable sealing flap located in the interior of the shaft furnace. Such a system represents a dual seal formed on the one hand by the sorting container and on the other hand by the furnace itself. Both with the sorting container moved away and also during the feeding process the shaft furnace is sealed in a gastight manner, so that fresh air entering either through the shaft furnace inlet or through the gas discharge conduit cannot form an explodable mixture. Likewise dust is prevented from surging out of the shaft furnace to thereby pollute the environmental conditions. At the same time the system, according to the invention, assures the profitability of the melt-down method.

A good sealing effect is accomplished between the sorting container and the shaft furnace inlet particularly by providing a sealing surface formed by a metal strip which is located opposite the sealing edge of the sorting container, at the shaft furnace inlet.

The production of this sealing surface is favored furthermore by the fact that the shaft furnace inlet is formed from a relatively low foreshaft.

More specifically, the upper portion of the shaft furnace, defining the shaft furnace inlet, is relatively short, in height, when compared to the upper charging portions of the prior art shaft furnaces.

A measure supporting the profitability of the method used for a better distribution of the material to be sorted which per se can be poured only with difficulty consists in that the top area of the shaft furnace consists of a plurality of sorting chambers separated from each other and forming lock chambers which can be locked, at the chamber outlet, from the bottom with one sealing flap in each case. This system already distributes the material to be sorted at the shaft furnace inlet, so that the distribution is practically assigned to the crane.

In order to render the distribution of the material to be sorted favorable also in the area of the outlet of the sorting chamber, provisions also are made so that sorting chamber outlets placed adjacent to each other are provided with sealing flaps movable in pairs in their open position in opposite directions. As a result, the material to be sorted is distributed and fed by the three-dimensional sectioning also at the outlets of the sorting chamber over the cross-section of the furnace.

It also proves to be favorable that the sorting chambers are of tapering design at the chamber outlet.

Additional measures for the operation of the shaft furnace, for the purpose of avoiding the discharge of dust and also the danger of explosions are assured by a method for the operation of the shaft furnace. It is contemplated in this connection that after the gas tight placing of the sorting container and the pivoting away of the sealing flap at the shaft furnace inlet, the bottom flaps of the sorting container are pivoted away with the simultaneous infeed of flushing gas into the sorting container. The flushing gas may consist of nitrogen or other non-combustible gases which counteract the danger of any explosion.

According to another phase of the method, explosions are prevented in the upper area of the shaft furnace by continuously supplying inert gas to the sorting chambers.

The drawing exemplifies one embodiment of the invention, which is described below in detail.

DETAILED DESCRIPTION OF THE DRAWINGS

Figure 1:
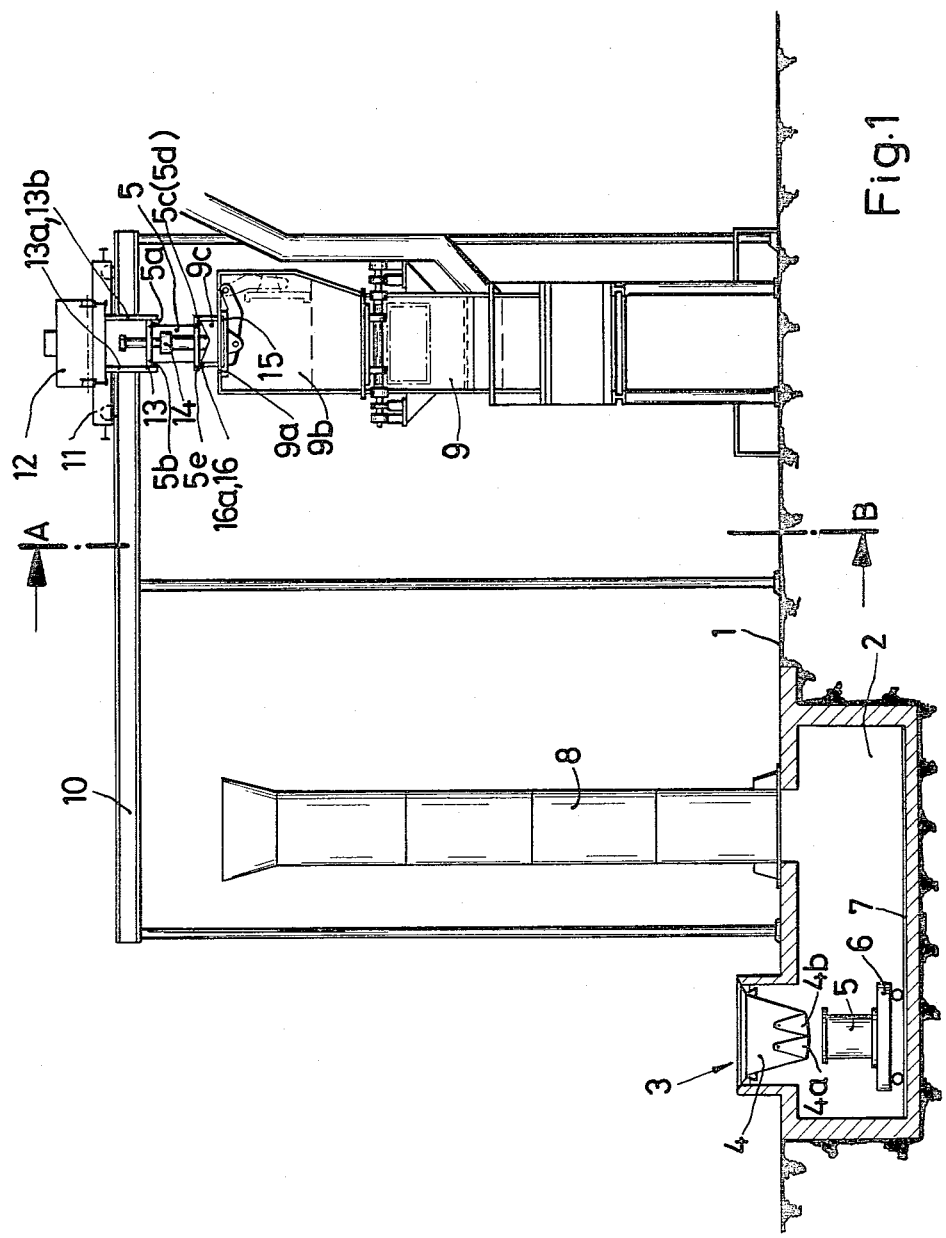
FIG. 1 shows a side cross sectional view of a shaft furnace installation for the melting down of non-ferrous metals.

The shaft furnace installation represented in FIG. 1 has, in addition to the mixing bed (not shown), a preparedness area 2 located below the hall floor 1. The readiness pocket 4 consisting of two bowl halves 4a, 4b, is provided at the inlet 3. The sorting container 5 is located on the car 6 below the readiness pocket 4, which is moved on the track 7 located below the hoisting conveyor 8. Thus the loading station is located below the readiness pocket 4. The crane runway 10, on which the car 11 is movable extends in a horizontal plane above the hoisting conveyor 8 and the shaft furnace 9. The car 11 carries, in addition to the driving mechanism, a lifting mechanism 12 (only indicated), a trailer cross arm 13 having a pair of piston-cylinder drives 14 for the cover 5a of the sorting container 5 which consequently can be raised and lowered by the trailer cross arm 13. Furthermore, a mating edge 5b for the cover 5a is secured at the sorting container 5, the gripping claws 13a, 13b gripping beneath said cover 5a in an engaging and disengaging manner. The sorting container 5, located above the shaft furnace (9) used, for example, for melting down lead includes the unloading station. Bottom flaps 5d are positioned pivotably (not visible in detail) at the bottom 5c of the sorting container 5, and the sealing edge 5e bears down on the shaft furnace inlet 9a. The shaft furnace inlet 9a is sealed gastight from the interior 9b by means of a sealing flap 15. A metal strip 16, forming a sealing surface 16a is located opposite the sealing edge 5e of the sorting container 5 at the shaft furnace inlet 9a. The shaft furnace inlet 9a has a relatively low foreshaft 9c.

More specifically, the upper portion of the shaft furnace, defining the shaft furnace inlet, is relatively short, in height, when compared to the upper charging portion of the prior art shaft furnaces.

Figure 2:
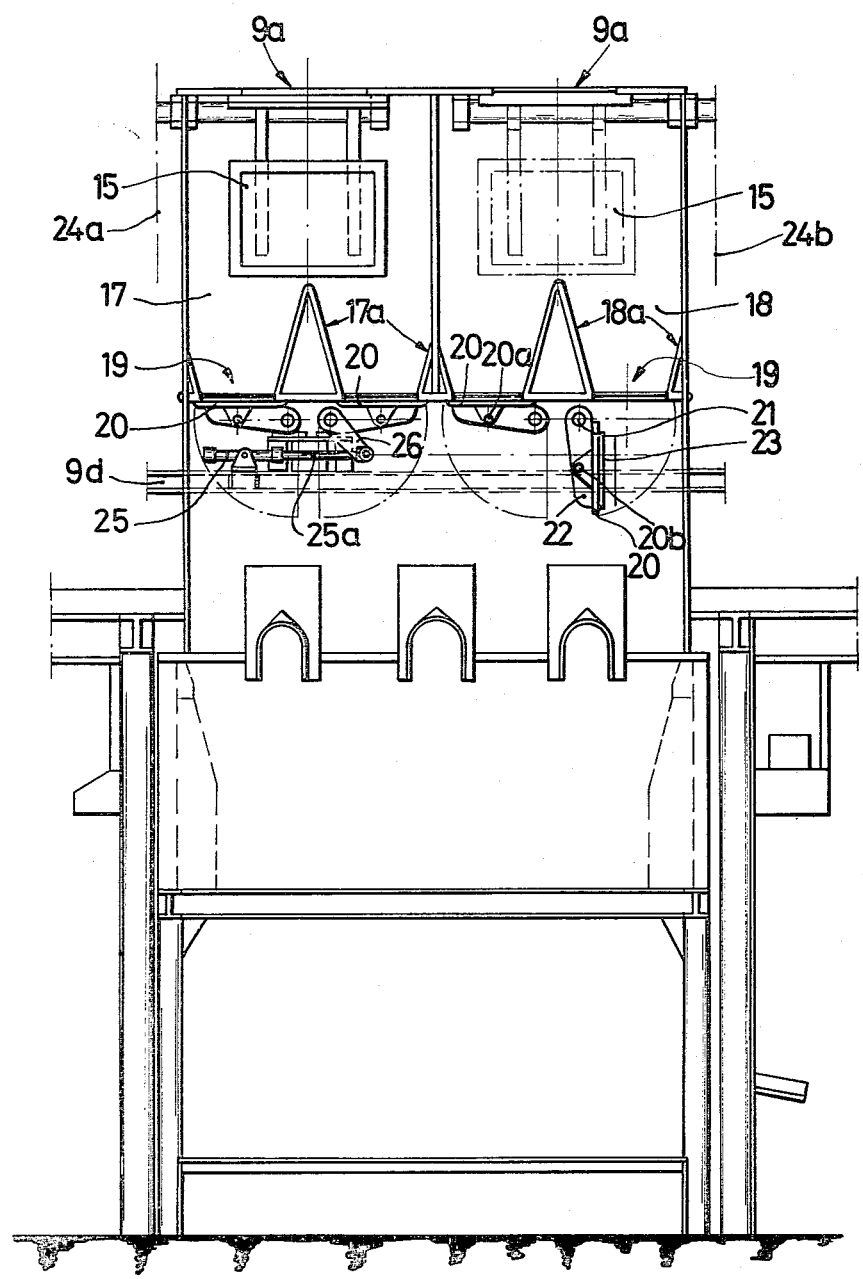
FIG. 2 shows a cross sectional view of a portion of the shaft furnace taken in the direction indicated in FIG. 1 along the plane A-B.

The upper area of the shaft furnace 9 is divided into several sorting chambers 17, 18 (FIG. 2) which are separated from each other. Each of the sorting chambers forms a lock chamber. While the shaft furnace inlet 9a is lockable gastight by means of the sealing flaps 15, sealing flaps 20 likewise are arranged at the chamber outlet. The sealing flaps 20 are arranged rotatably about shafts 21 by levers 22, advantageously and additionally about shafts 20a, 20b, so that the sealing surface 23 can be adapted to the contour of the counter-sealing surface in each case. The sealing flaps 15 are actuated in each case by piston-cylinder drives 24a and 24b indicated by dots and dashes. Piston-cylinder drives 25 are positioned for the sealing flaps 20 on the shaft furnace scaffold 9d and articulated with their piston rods 25a via levers 26 connected to the levers 22. The sorting chambers 17, 18 taper at 17a and/or 18a for the purpose of a planned uniform distribution of the material to be sorted.

A lead furnace with a hearth surface of about 6×2.5 meters forms the basis of this embodiment. For the furnace feed of such a shaft furnace four sorting containers 5 with a sorting capacity of 1.5 cubic meters each per hour are needed. The shaft furnace installation is so laid out that six sorting containers can be operated per hour. The call for the shaft furnace feed originates from a loading level monitoring system which operates on the basis of stockline indicator probes. In the starting position, prior to the impulse from the loading level monitoring system the two sorting chambers 17, 18 shown here are filled with charges. The sorting container 5 is located loaded below the hoisting conveyor 8 on the car 6 and loosely suspended onto the car 11. The readiness pocket 4 is likewise filled with 1.5 cubic meters of sorting mixture.

As soon as the mixture column had dropped so far in the shaft furnace 9 that additional sorting material is needed, the mentioned loading level monitor delivers the impulse to the shaft furnace 9 and to the car 11. Now the loading operation is started.

Both chambers 17 and 18 each of which have a volume of 22 cubic meters ($m^3$) take over the feeding of the sorting mixture into the shaft furnace 9. The sorting chambers 17, 18 divide the shaft furnace area into two equal parts to make possible a good distribution of the sorting material. The sealing flaps 15 of which one in each case is provided for each sorting chamber 17 and/or 18 are pressure-tight, while the lower sealing flaps 20 function as so-called holding flaps for the material to be sorted and they need not be designed gastight.

As soon as the loading level monitoring system starts the "loading process" impulse, the two sealing flaps 20 open and the material to be sorted reaches the shaft furnace area 27, not shown. The sealing flaps 20 of the sorting chamber 17 close again and the same program proceeds for the sorting chamber 18.

Thirty seconds after the impulse of the loading level monitoring system the hoisting conveyor 8 commences with the hoisting of a loaded sorting container 5. After another 30 seconds, with the sorting container 5 occupying its topmost position, the moving of the car 11 to the sorting chamber 17 is introduced. Following another thirty seconds of travel time the sorting container 5 has reached the load position for the sorting chamber 17 and it is lowered. The sorting container 5 thereby contacts a terminal switch (not shown in detail) and the lifting mechanism 12 of the car 11 descends further until the bottom flaps 5d at the sorting container 5 open; this occurs automatically by the descent. After emptying, the sorting container 5 is raised and, following the closing of the bottom flaps 5d, the sealing flap 15 of the sorting chamber 17 is closed. Commensurate with the feeding cycle the flaps 15 are actuated automatically by the piston-cylinder drives 24a, 24b and/or 25. The sealing surfaces of the sealing flaps 15 are so arranged that the material to be sorted cannot contact them. Thus no wear due to slipping can occur.

The closing of the sealing flaps 20 takes place at reduced hydraulic pressure as well as with a very slow closing speed. If material to be sorted happens to be located in the area of the sealing flaps 20, the sealing flap is held firmly by the low hydraulic pressure and the terminal switch "close sealing flap 20" does not respond. Material located in the area of the sealing flap 20 can be removed by special poking doors. For that purpose two poking doors and two sight glasses are provided in the upper region of the shaft furnace 9; also four openings each are provided in the lower area of the shaft furnace 9.

I claim:
1. A shaft furnace apparatus for use in connection with the recycling of non-ferrous metals, comprising:
   (a) a shaft furnace having an inlet;

(b) a crane runway located directly above said shaft furnace inlet, said crane runway having a loading station position and an unloading station position;
(c) said unloading station position being located directly above said shaft furnace inlet;
(d) a carriage movable on said crane runway between said loading station position and said unloading station position;
(e) a sorting container, capable of being transported by said carriage;
(f) a trailer cross arm secured to said carriage for selectively securing and releasing said sorting container from said carriage at said loading station position and unloading station position;
(g) said sorting container being lockable from the top by a cover;
(h) said cover being grippable by said trailer cross arm to effectuate securing and releasing of said sorting container, as desired;
(i) the bottom of said sorting container, when located at said unloading station position, serving to seal, in a gas-tight manner, said shaft furnace inlet;
(j) said sorting container being provided with a bottom sealing edge provided with a selectively opening and closing, downwardly pivoting bottom flap/s/; and
(k) said shaft furnace inlet also being sealable in a gas-tight manner by a sealing flap pivotally located within the interior of said shaft furnace.

2. A shaft furnace apparatus as claimed in claim 1, further comprising:

(a) a sealing surface formed by a metal strip at said shaft furnace inlet, said sealing surface being located opposite said bottom sealing edge of said sorting container.

3. A shaft furnace apparatus as claimed in claim 1, wherein
(a) said shaft furnace inlet is formed from a relatively short, in height, shaft top portion of said shaft furnace.

4. A shaft furnace apparatus as claimed in claim 1, further comprising
(a) the top portion of said shaft furnace is provided with a plurality of sorting chambers;
(b) said sorting chambers being separated from each other;
(c) said sorting chambers having chamber outlets which are lockable by sealing flaps to thereby form individual lock chambers; and
(d) said sorting chambers serving to receive said metals from said sorting containers by being located at said shaft furnace inlet and beneath said sorting containers when said sorting containers are at said unloading station position.

5. A shaft furnace apparatus as claimed in claim 4, wherein:
(a) said sealing flaps are provided in movable pairs which open in opposite direction to one another.

6. A shaft furnace apparatus as claimed in claim 4, wherein:
(a) said sorting chambers have a downward tapered design extending toward the chamber outlet.

* * * * *